United States Patent
Roehlich et al.

(10) Patent No.: US 10,378,082 B2
(45) Date of Patent: Aug. 13, 2019

(54) PROCESS FOR REMOVING PRECIOUS METAL FROM PRECIOUS METAL-CONTAINING CATALYST FORM BODIES

(71) Applicant: Heraeus Deutschland GmbH & Co. KB, Hanau (DE)

(72) Inventors: Christoph Roehlich, Hanau (DE); Vasco Thiel, Alzenau (DE); Stefanie Fuchs-Alameda, Biebergemünd (DE); Jan Schapp, Potsdam (DE); Steffen Voss, Limeshain (DE)

(73) Assignee: HERAEUS DEUTSCHLAND GMBH & CO. KG, Hanau (DE)

(*) Notice: Subject to any disclaimer, the term of this patent is extended or adjusted under 35 U.S.C. 154(b) by 162 days.

(21) Appl. No.: 15/523,757

(22) PCT Filed: Oct. 12, 2015

(86) PCT No.: PCT/EP2015/073542
§ 371 (c)(1),
(2) Date: May 2, 2017

(87) PCT Pub. No.: WO2016/074872
PCT Pub. Date: May 19, 2016

(65) Prior Publication Data
US 2017/0349970 A1  Dec. 7, 2017

(30) Foreign Application Priority Data
Nov. 10, 2014 (EP) .................. 14192464

(51) Int. Cl.
C22B 3/00 (2006.01)
B01J 23/96 (2006.01)
B01J 38/68 (2006.01)
C22B 11/06 (2006.01)

(52) U.S. Cl.
CPC ............ *C22B 11/048* (2013.01); *B01J 23/96* (2013.01); *B01J 38/68* (2013.01); *C22B 11/06* (2013.01); *Y02P 10/214* (2015.11)

(58) Field of Classification Search
CPC ........ C22B 7/007; C22B 11/048; B01J 23/96; B01J 38/68
See application file for complete search history.

(56) References Cited

U.S. PATENT DOCUMENTS

| 3,016,354 A | 1/1962 | Keine | |
|---|---|---|---|
| 3,985,854 A * | 10/1976 | Bradford | B01J 23/96 423/22 |
| 7,166,145 B1 * | 1/2007 | Han | C22B 3/06 75/744 |
| 2007/0183951 A1 * | 8/2007 | Nakatsu | C22B 3/065 423/22 |
| 2016/0362804 A1 * | 12/2016 | Chen | C22B 3/065 |

FOREIGN PATENT DOCUMENTS

| CN | 1448522 A | 10/2003 | |
|---|---|---|---|
| CN | 101376923 A | 3/2009 | |
| CN | 102560129 A | 7/2012 | |
| CN | 103451433 A | 12/2013 | |
| JP | 2004225067 A | 8/2004 | |
| WO | WO-03010346 A2 * | 2/2003 | ............ B01J 8/0242 |
| WO | WO-2011140593 A1 | 11/2011 | |
| WO | WO 201513607 A1 * | 9/2015 | |

OTHER PUBLICATIONS

Espacenet family data for US 20160362804 Dec. 15, 2016.*
Berakat et al., "Recovery and separation of palladium from spent catalyst," Applied Catalysis A: General, Elsevier Science, 301(2) Feb. 24, 2006, pp. 182-186.
International Search Report issued in PCT/JP2015/073542 dated Jan. 22, 2016.

* cited by examiner

Primary Examiner — Tima M. McGuthry-Banks
(74) Attorney, Agent, or Firm — Blank Rome LLP

(57) ABSTRACT

Process for removing precious metal from precious metal-containing catalyst form bodies comprising form bodies and precious metal, whereby the precious metal to be removed is at least one precious metal selected from the group consisting of Au, Ag, Pd, Pt, Ir, Rh, Ru, Os, and Re, comprising the steps of: (a) producing a mixture of precious metal-containing catalyst form bodies in at least one mineral acid that is at least 1N; (b) supplying inert or oxidizing gas into the mixture containing noble metal-containing catalyst form bodies and mineral acid; (c) introducing at least one oxidation agent, in solid or liquid form, into the mixture containing noble metal-containing catalyst form body and mineral acid; and (d) separating the form bodies from the liquid.

15 Claims, No Drawings

PROCESS FOR REMOVING PRECIOUS METAL FROM PRECIOUS METAL-CONTAINING CATALYST FORM BODIES

RELATED APPLICATIONS

The present application is a National Phase of PCT Patent Application PCT/EP2015/073542 filed Oct. 12, 2015, which claims priority to European Application No. 14192464.7 filed Nov. 10, 2014. The entire disclosures of those applications are hereby incorporated by reference.

TECHNICAL FIELD

The present invention relates to a process for removing precious metal from precious metal-containing catalyst form bodies.

Nowadays, a multitude of chemical processes uses precious metals and precious metal-containing species as catalysts. As a matter of principle, there are two states, in which the precious metal can be present in the process. The catalytically active species is either present in a homogeneous mixture that includes the reactants or the catalytically active species is most often deposited on an inert carrier material and is present as a heterogeneous mixture that includes the reactants. In many cases, heterogeneous catalysts are preferred since they can be removed easily from the reaction mixture, e.g. by filtration. A multitude of chemical processes on an industrial scale, such as, e.g., reforming in fuel production, the production of monomers for polymer chemistry or the production of ammonia, utilise heterogeneous catalyst on a multi-ton scale.

For improved handling of heterogeneous catalyst materials, the precious metals are usually applied to usually inert macroscopic form bodies that consist, e.g., of aluminium oxide or silicon oxide. The materials used for this type of form body are usually highly porous and thus enable a uniform distribution of the precious metal over a large surface. The good accessibility of the fine-distributed precious metal centres on the surface ensures high catalytic activity. For example cords, cylinders, pellets, rings, multi-whole rings, spheres, saddles, wheels, chairs, foam bodies or honeycombs that can be produced, inter alia, by extrusion or pressing are used as form bodies.

The activity of the precious metal-containing catalyst decreases after a certain operating time and the catalyst needs to be replaced. Due to the high price of precious metals, the utilisation of precious metal-containing catalysts is often economical only if the precious metal used in the process can be recovered. Typically, spent heterogeneous precious metal catalysts based on porous form bodies as carriers are ground for reprocessing and the precious metal is subsequently removed by dissolution. Alternatively, the precious metal-containing catalyst form body is separated into precious metal and carrier material by melting metallurgy technique. In either case, the form bodies are being destroyed.

However, since the production of the form bodies serving as carriers can also be quite costly, it is desirable to reuse not only the precious metal, but also the form bodies. This necessitates processes that can remove the precious metal efficiently and in non-destructive manner from spent precious metal-containing catalyst form bodies.

U.S. Pat. No. 3,016,354 teaches a process for recovery of platinum from platinum-containing catalyst form bodies, in which chlorine gas is supplied through a mixture of hydrochloric acid and platinum-containing catalyst form bodies.

Supplying gaseous chlorine and other gaseous oxidation agents is associated with a number of disadvantages.

Firstly, the use of chlorine gas necessitates significant equipment-related measures, both for provision and for discharge of the highly reactive gas.

Secondly, supplying an oxidation agent in the gaseous state, for example chlorine, is not efficient, since significant amounts of the gas used for this purpose flow through the solution without sufficiently contacting the precious metal-containing catalyst form bodies. This fact necessitates, for example, a technically sophisticated recovery facility for chlorine gas or corresponding exhaust gas scrubbing or it requires the use of a high excess of chlorine gas. Chlorine recovery, exhaust gas scrubbing and the use of excess chlorine gas render the process uneconomical.

It was therefore the object of the present invention to develop an efficient process for virtually complete removal of precious metal from precious metal-containing catalyst form bodies (=the heterogeneous catalyst) whereby the form bodies are not destroyed and can be reused for producing heterogeneous catalysts. It was another object of the present invention to provide a process that utilises the oxidation agent utilised in this context better than the prior art.

SUMMARY

The object is met by the process of the present invention according to claim 1. This is implemented by a process for removing precious metal from precious metal-containing catalyst form bodies comprising form bodies and precious metal, whereby the precious metal to be removed is at least one precious metal selected from the group consisting of Au, Ag, Pd, Pt, Ir, Rh, Ru, Os, and Re, comprising the steps of:
(a) producing a mixture of precious metal-containing catalyst form bodies in at least one mineral acid that is at least 1N;
(b) supplying inert or oxidising gas into the mixture containing precious metal-containing catalyst form bodies and mineral acid;
(c) introducing at least one oxidation agent, in solid or liquid form, into the mixture containing precious metal-containing catalyst form body and mineral acid; and
(d) separating the form bodies from the liquid.

In this context, step (a) precedes steps (b) and (c). In a preferred embodiment, steps (b) and (c) proceed in parallel, i.e. simultaneously or overlapping with each other Alternatively, step (b) can be performed first followed by step (c) or step (c) is performed before step (b).

The process according to the invention can just as well comprise further process steps that proceed before, after or between steps (a), (b), (c), and (d).

DETAILED DESCRIPTION

In the scope of the present invention, the term, form body, shall be understood to mean the basically precious metal-free inorganic carriers onto which catalytically effective precious metal can be applied.

In the scope of the present invention, the term, precious metal-containing catalyst form bodies, shall be understood to mean form bodies that comprise catalytically active precious metal.

It is the object of the present invention to remove precious metal from precious metal-containing catalyst form bodies sufficiently completely and gently that the foreign bodies separated from the precious metal are suitable for reuse for production of precious metal-containing catalyst form bodies that can be used as heterogeneous catalysts. The precious metal-containing catalyst form bodies from which precious metal is to be removed are, in particular, spent heterogeneous catalysts.

The process according to the invention can be applied to precious metal-containing catalyst form bodies, whereby precious metals shall be understood to be the elements, Au, Ag, Pd, Pt, Ir, Rh, Ru, Os, and Re. The precious metals can be present on and/or in the precious metal-containing catalyst form bodies either alone or in any combination. In this context, the precious metal or precious metals can be present, partially or fully, as elements in oxidation stage (0). Typically, the precious metal-containing catalyst form bodies contain 0.1-50% by weight precious metal relative to their total weight.

For a carrier material to be suitable for foreign bodies in precious metal-containing catalyst form bodies, it must be as chemically inert as possible with respect to many different reaction conditions. In particular, the form bodies must be inert with respect to strongly acidic or oxidising reaction conditions. In addition to chemical stability, it is also required that the materials can resist high mechanical stress as well. Since precious metal-containing catalyst form bodies are often used as bulk catalysts, high resistance to abrasion is particularly required. It has been evident that inorganic ceramic materials are particularly well-suited for use as materials for form bodies. In this context, both pure oxide ceramics, such as aluminium oxide, magnesium oxide, zirconium oxide, titanium dioxide, silicon dioxide as well as mixed oxide ceramics, such as, e.g., aluminium titanate, dispersion ceramics ($Al_2O_3/ZrO_2$), lead-zirconate titanate, and barium titanate can be used. Moreover, the carrier materials of which the foreign bodies consist can be doped with further elements, such as, e.g., rare earth metals, in order to further increase the chemical stability. Preferably, 75-100% by weight of the form bodies consist of oxides of at least one element selected from the group consisting of Al, Ti, Mg, Zr, Sn, Fe, and Si that are inert with respect to acids (essentially or completely inert with respect to acids).

Aside from the oxidic materials, non-oxidic ceramics, such as, for example, silicon carbide, silicon nitride, aluminium nitride, boron carbide, and boron nitride can be used as carrier material for form bodies.

In order to take up the catalytically active precious metal as well as possible, one preferred embodiment uses porous materials with a large surface area on which catalytically active precious metal is present as fine-distributed as possible. Porous $\alpha$-$Al_2O_3$ has proven to be particularly well-suited.

To improve their handling characteristics, heterogeneous catalysts are typically processed into various foreign bodies, such as, e.g. cords, cylinders, pellets, rings, multi-whole rings, spheres, saddles, wheels, chairs, foam bodies or honeycombs. For example extrusion and pressing are used in the production. The form bodies thus produced can have diameters of, for example, 100 μm to 50 centimeters in their thickest places.

For recovery of precious metal from spent precious metal-containing catalyst form bodies, it is necessary to remove, by dissolving, the precious metal virtually completely from the form bodies. The phrase, remove completely by dissolving, shall be understood to mean that the form bodies from which the precious metal is removed in the process according to the invention comprise ≤100 ppm precious metal relative to the total weight.

According to the invention, mineral acid is used in the process, such as, for example, hydrochloric acid, hydrobromic acid, hydriodic acid, nitric acid, sulfuric acid and/or phosphoric acid. The mineral acid or mineral acids used in process step (a) are either concentrated or they are diluted solutions having a concentration of ≥1 mol acid ($H_3O^+$) per liter.

According to the present invention, a mixture of precious metal-containing catalyst form bodies in mineral acid that is at least 1N is produced in process step (a). Preferably, the precious metal-containing catalyst form body is fully covered by liquid and/or mineral acid in the mixture.

According to process step b) of the present invention, gas is supplied into a mixture produced as described above in order to provide for mixing, for example continuous mixing. It is preferred in this context to supply gas into the lower half of the mixture made of precious metal-containing catalysts form body and mineral acid. It is particularly preferred to supply gas on the bottom of the reaction container. Preferably, the gas is supplied appropriately such that the gas bubbles rising in the liquid percolate through the mixture and provide for sufficient mixing. Preferably, the gas flow is to be set appropriately such that the gas bubbles flow around the precious metal-containing catalyst form body, such that, mostly, the liquid is being mixed and the catalyst form bodies are moved not at all or only little. This can prevent abrasion on the form bodies, i.e. the form bodies can be protected mechanically and can therefore be reused more often. Preferably, the gas flow can be set appropriately such that the mixture does not splash while being mixed. Specific setting of the gas flow allows the mixture to be moved appropriately such that the reaction is made to proceed uniformly in the entire reaction vessel.

According to the invention, conceivable gases for mixing (mixing gas) are gases that are inert or have an oxidising effect, for example are inert or have an oxidising effect with respect to precious metals. For example air or other gas mixtures of oxygen and inert gases can be used as mixing gases with oxidising effect. It is preferred according to the invention to abstain from the use of chlorine gas or chlorine gas-containing gas mixtures. The use of mixing gases with an oxidising effect can increase the yield of the precious metal that is to be removed by dissolving. According to the invention, inert gases, such as, e.g., nitrogen, argon or carbon dioxide, can just as well be used as mixing gases. The use of inert gas or gas with an oxidising effect for mixing allows the reactivity of the mixture to be controlled. If inert mixing gas is used, the reactivity of the mixture can be reduced, whereby the use of an oxidising gas can increase the reactivity of the mixture.

At least one oxidation agent is introduced into the mixture containing precious metal-containing catalyst form body and mineral acid in step (c) of the process according to the invention. According to the invention, the at least one oxidation agent is introduced into the mixture in solid or liquid form. The at least one oxidation agent can be introduced into the mixture, e.g., by means of a lance or a hose. It can be preferred to introduce the at least one oxidation agent, in particular a liquid oxidation agent, into the mixture in the lower half, and particularly preferably on the bottom, of the reaction container.

In a special embodiment, the at least one oxidation agent is introduced into the mixture basically in the same place as the mixing gas.

Preferably, the at least one oxidation agent, in solid or liquid form, is soluble in the mineral acid used in the process.

Typical oxidation agents for use in the process according to the invention are selected from the group consisting of chlorates, nitrates, bromates, iodates, chlorites, bromites, iodites, hypochlorites, hypobromites, hypoiodites, perchlorates, bromine, iodine, peroxides, permanganates, and chromates. According to the invention, combinations of multiple different oxidation agents, in solid or liquid form, can be introduced into the mixture just as well. If the oxidation agent is added as a solid, it can be present, for example, as a salt of alkali or alkaline earth metals. In particular, sodium or potassium chlorate can be used.

To ease the handling and dosing, it is feasible to add the at least one oxidation agent in the form of a solution. Preferably, the at least one oxidation agent added and the mineral acid form a homogeneous solution. In some cases, the mineral acid of the mixture thus produced can have an oxidising effect as well. The phrase, "at least one oxidation agent", in step (c) of the process according to the invention shall be understood to mean oxidation agents that differ from the mineral acid or mineral acids used in the process according to the invention.

The exposure time of the at least one oxidation agent is not subject to any limitation. In a preferred embodiment, the exposure time can be 5-240 minutes, particularly preferably 10-120 minutes, and in particular 15-60 minutes.

The process according to the invention can be implemented at room temperature, e.g., 15-25° C. However, it can also be preferred to implement the process at elevated temperatures up to the boiling temperature. In particular, the method is implemented at temperatures of 30-90° C.

The introduction of at least one oxidation agent in solid or liquid form has several advantages as compared to gaseous oxidation agents. Firstly, the needed quantity of oxidation agent can be dosed very accurately since it can be made sure that all oxidation agent used is actually present in the mixture. Secondly, the solid or liquid addition of at least one oxidation agent can ensure optimal contact between the precious metal to be removed, by dissolving, and the oxidation agent. In contrast, with gaseous oxidation agents, such as chlorine gas, like in the case of the process known from U.S. Pat. No. 3,016,354, not all of the oxidation agent reaches the precious metal to be oxidised, since it does not dissolve completely in the mixture and has limited contact to the precious metal only.

One of the advantages of the process according to the invention is the result of supplying the mixing gas and the at least one oxidation agent independent of each other. This allows for optimal dosing of the at least one oxidation agent and simultaneously provides for optimal mixing such that the precious metal can be removed completely or virtually completely, by dissolving, from the form bodies to be freed of precious metal, while exposing the form bodies too little mechanical stress. Due to the improvement in contact between precious metal and the at least one liquid or solid oxidation agent, it is feasible to remove, by dissolving, the precious metal from the precious metal-containing catalyst form bodies in a shorter period of time as compared to gaseous oxidation agent. As a result, the foreign bodies are exposed to mechanical and chemical stress for a shorter period of time.

The lesser mechanical stress on the foreign bodies during the process according to the invention is reflected, inter alia, in that only a small amount of abraded material is produced. The less abraded material, also called fines, are produced in the process, the more gentle the process is on the form bodies.

Once the supply of the at least one liquid or solid oxidation agent is completed and the precious metal has been removed, by dissolving, from precious metal-containing catalyst form bodies, the solid (form body) is separated from the solution, for example by decanting, filtration or centrifugation, in process step (d).

The solid can be washed at least once, for example with mineral acid or, preferably, with water in a process step (e). In this context, precious metal can be removed from the solid as close to completely as possible. The original reaction solution containing the majority of the precious metal removed by dissolving can then be combined with the washing liquid. The precious metal can be recovered from the combined solutions according to known technical processes.

Aside from precious metals, non-ferrous metals, in particular cadmium (Cd), cobalt (Co), copper (Cu), nickel (Ni), lead (Pb), tin (Sn), zinc (Zn), vanadium (V), manganese (Mn), chromium (Cr), as well as iron (Fe) can be removed from the precious metal-containing catalyst form bodies by the process of the present invention.

The use of the process according to the invention allows precious metal-free form bodies to be recovered that can be processed into new catalysts again. Preferably, said precious metal-free form bodies contain ≤100 ppm precious metal, relative to the total weight, after implementation of the process.

The use of the process according to the invention further allows a precious metal-containing solution to be obtained that can contain one or more non-ferrous metals in addition to the precious metal removed from the catalyst form bodies.

The process according to the invention allows for removing, by dissolving, more than 99% by weight of the precious metal that is originally present on the precious metal-containing catalyst form bodies.

EXAMPLES

Example 1 shows a preferred embodiment of the process according to the invention on a pilot scale.

Example 1

In a vessel, 592 kg precious metal-containing catalyst form bodies (0.510 wt. % Pd on spheres made of α-$Al_2O_3$, 4 mm diameter; corresponding to 3019 g Pd) work mixed with 213 L water and 321 L 10M HCl. Compressed air was supplied such that the bulk material was next sufficiently, though without the surface of the solution splashing. This was heated to 60° C.

A total of 10 L 0.45M $NaClO_3$ solution were supplied on the bottom into the vessel and this was allowed to rest for 15 min. This procedure was repeated twice. The mixture was maintained at 60° C. for another 2 h. Then, the reaction solution was pumped from the vessel.

The solid residue was then washed 6× with water. For this purpose, water was added until it covered the material, this was mixed by compressed air for 30 min, and the solution was subsequently removed by pumping.

The reaction solution and the wash solutions were combined in a vessel. The combined solutions were allowed to rest overnight during which the fine fractions sedimented. The solution was decanted, the residue filtered through a fines filter ("Blauband") and washed. The collected filter residues (fine fractions) were dried. A total of 380 g signs were obtained (0.064% of the starting material).

The form bodies were removed from the vessel and dried until their weight remained constant. A palladium analysis by means of ICP-OES resulted in a residual content of 60 ppm Pd relative to the total weight of the form bodies, corresponding to a yield of 99%.

Examples 2-4, on a laboratory scale, demonstrate the difference in abrasion during the use of sodium chlorate solution as oxidation agent as compared to supplying chlorine gas.

Example 2

200 g of a precious metal-containing catalyst form body (0.510% Pd on spheres made of $\alpha$-$Al_2O_3$, 4 mm diameter; corresponding to 1020 mg Pd) were weighed into a 500 mL three-necked flask, covered with 200 ml 5M HCl, and heated to 60° C. Subsequently, compressed air was injected using a supply tube (40 L/h), and a pipette was used to inject 2 mL 4.5M $NaClO_3$ solution from below into the material and allowed to act for 5 minutes, then another 1.5 mL were added and allowed to react for 10 minutes. The form bodies were separated from the reaction solution by sieving. 120 mL of water were added to the foreign bodies 6×, this was allowed to rest for 1-2 hours each, and subsequently poured again through the sieve. The combined solution including the fines fractions contained therein were filtered through a fines filter ("Blauband"), the filtrate was mixed and then analysed for its aluminium content. The form body and the fines fractions obtained each were dried and weighed.

Example 3

Analogous to the example 2 with the only difference being that, instead of adding sodium chlorate solution, chlorine (3 L/h) was supplied into the mixture for 15 minutes in addition to compressed air.

Example 4

Analogous to the example 2 with the only difference being that, instead of adding sodium chlorate solution, chlorine (3 L/h) was supplied into the mixture for 60 minutes in addition to compressed air.

The following table shows a comparison of the results of the Pd residue content as well as the stress on the foreign bodies (abraded material, as well as dissolved Al) of examples 2-4. The comparison of examples 2 and 3 shows that treatment with chlorate results in better mobilisation of palladium in the same period of time as compared to treatment with an equivalent amount of chlorine gas. The comparison of examples 2 and 4 shows that the treatment with chlorine gas needs to be longer to mobilise more palladium. The comparison of examples 3 and 4 shows that the form bodies are stressed more strongly if the treatment time is longer. Longer treatment causes more aluminium to be removed, by dissolving, from the form body and more abraded material (fines) to be generated.

| Example | Fines in filter [g] | Dissolved aluminium [mg] | Residual Pd content in the form bodies [%, relative to original Pd content] |
|---|---|---|---|
| 2 | 0.90 | 50 | 2.94 |
| 3 | 1.04 | 60 | 3.92 |
| 4 | 1.09 | 70 | 1.96 |

The invention claimed is:

1. A process for removing a precious metal from precious metal-containing catalyst form bodies comprising form bodies and a precious metal, whereby the precious metal to be removed is at least one precious metal selected from the group consisting of Au, Ag, Pd, Pt, Ir, Rh, Ru, Os, and Re, comprising the steps of:
   (a) producing, in a reaction vessel, a mixture of the precious metal-containing catalyst form bodies in at least one mineral acid that is at least 1N;
   (b) supplying an inert or oxidising gas into the mixture containing the precious metal-containing catalyst form bodies and the at least one mineral acid;
   (c) introducing at least one oxidation agent, in solid or liquid form, into the mixture containing the precious metal-containing catalyst form bodies and the at least one mineral acid, the at least one oxidation agent being introduced into the mixture in a lower half of the reaction vessel; and
   (d) separating the form bodies from the mixture,
   wherein step (a) precedes steps (b) and (c).

2. The process according to claim 1, further comprising an additional step (e), in which the at least one oxidation agent is a solid and the solid is washed.

3. The process according to claim 1, wherein the mineral acid is selected from the group consisting of hydrochloric acid, hydrobromic acid, hydriodic acid, nitric acid, sulfuric acid, and phosphoric acid.

4. The process according to claim 1, wherein the at least one oxidation agent is selected from the group consisting of chlorates, nitrates, bromates, iodates, chlorites, bromites, iodites, hypochlorites, hypobromites, hypoiodites, perchlorates, bromine, iodine, peroxides, permanganates, and chromates.

5. The process according to claim 1, wherein the precious metal-containing catalyst form body is fully covered by liquid in the mixture.

6. The process according to claim 1, wherein the precious metal-containing catalyst form bodies contain precious metals in oxidation stage (0).

7. The process according to claim 1, wherein 75-100% by weight of the form bodies consist of oxides of at least one element selected from the group consisting of Al, Ti, Mg, Zr, Sn, Fe, and Si that are inert with respect to acids.

8. The process according to claim 1, wherein the precious metal-containing catalyst form bodies used in step (a) contain precious metal in an amount of 0.1% by weight to 50% by weight.

9. The process according to claim 1, wherein the exposure time of the at least one oxidation agent in step (c) is 5-240 min.

10. The process according to claim 1, wherein the process temperature during steps (b) and (c) is in the range of 15° C. to the boiling temperature.

11. The process according to claim 1, wherein the process temperature during steps (b) and (c) is in the range of 30 to 90° C.

12. The process of claim 1, wherein the form bodies are porous.

13. The process of claim 1, wherein the form bodies are pure oxide ceramics or mixed oxide ceramics.

14. The process of claim 13, wherein the pure oxide ceramics are selected from aluminum oxide, magnesium oxide, zirconium oxide, titanium oxide, and silicon dioxide.

15. The process of claim 13, wherein the mixed oxide ceramics are selected from aluminum titanate, lead-zirconate titanate, barium titanate and $Al_2O_3/ZrO_2$ dispersion ceramics.

* * * * *